Feb. 13, 1951 W. W. MUMFORD 2,541,375
WAVE FILTER
Filed June 4, 1948 2 Sheets-Sheet 1
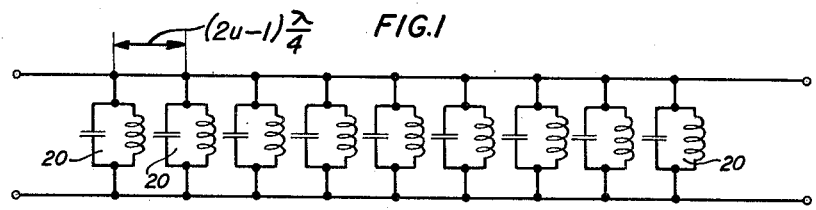
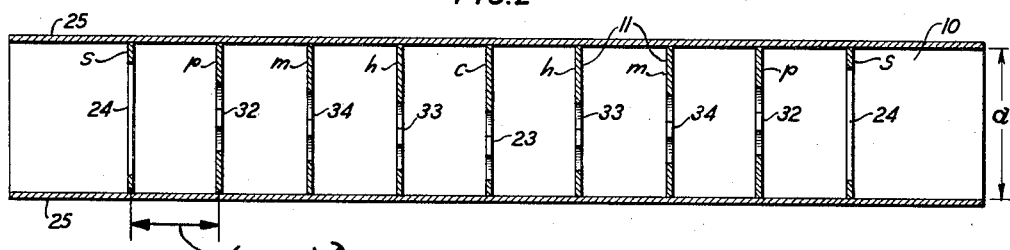
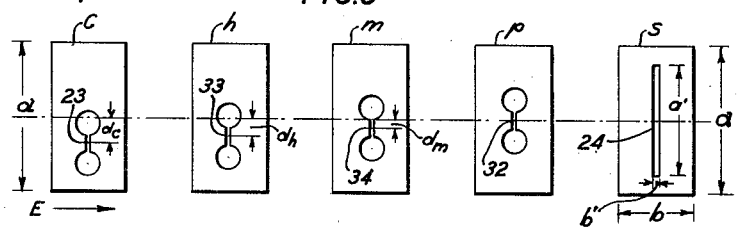
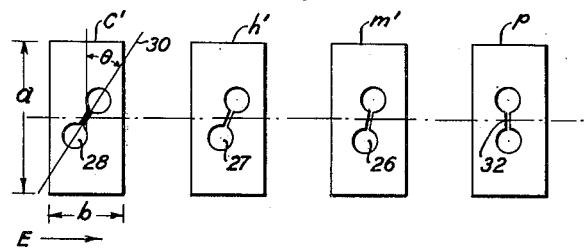
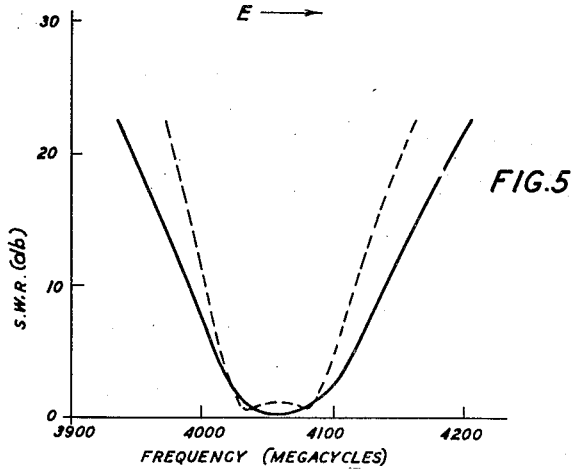
INVENTOR
W. W. MUMFORD
BY
Ralph T. Holcomb
ATTORNEY Feb. 13, 1951  W. W. MUMFORD  2,541,375
WAVE FILTER Filed June 4, 1948  2 Sheets-Sheet 2

INVENTOR
W. W. MUMFORD
BY
Ralph T. Holcomb
ATTORNEY

Patented Feb. 13, 1951

2,541,375

UNITED STATES PATENT OFFICE 2,541,375

WAVE FILTER

William W. Mumford, Atlantic Highlands, N. J., assignor to Bell Telephone Laboratories, Incorporated, New York, N. Y., a corporation of New York Application June 4, 1948, Serial No. 31,137

10 Claims. (Cl. 178—44)

This invention relates to frequency-selective networks and more particularly to microwave filters for use in wave guides.

An object of the invention is to improve the transmission characteristics of microwave filters. A more specific object is to equalize the insertion loss and minimize the reflection coefficient of such a filter over a wide band. A further object is to provide a resonant wave-guide element in which the sharpness of resonance, and consequently the width of the transmitted band, may be continuously varied.

In many applications it is desirable to have a microwave filter with a substantially flat insertion loss and a reflection coefficient which is substantially zero over as wide a band of frequencies as possible. A filter with such a characteristic is herein called a maximally-flat filter. This type of characteristic is of particular importance, for example, in microwave television repeaters, where the filter may be located some distance from the receiving antenna and reflections at the filter input will cause disturbing echoes.

In the microwave filters in accordance with the present invention the insertion loss can be made constant and the reflection coefficient substantially zero over as wide a band as desired by using a sufficient number of component elements. The filter comprises a plurality of resonant branches positioned within a hollow wave guide with a spacing between branches approximately equal to an odd integral number of quarter wavelengths at the mid-band frequency. In the embodiments shown the branches are constituted by apertured transverse partitions, or irises, which are resonant at or near the mid-band frequency. The apertures may, for example, be substantially rectangular in shape or they may be dumbbell-shaped, or of other suitable form.

For a maximally-flat filter in accordance with the invention, when the number of resonant branches exceeds two the respective band widths passed by the branches increase progressively from the center to the ends of the filter. This tapering of the pass bands may be accomplished by decreasing progressively the sharpness of resonance of the branches. The sharpness of resonance may, for example, be controlled by changing the size of the iris aperture, by moving the aperture off-center, or by rotating the iris in the wave guide. A feature of the invention is a rotatable iris in which the sharpness of resonance may be continuously adjusted.

The nature of the invention will be more fully understood from the following detailed description and by reference to the accompanying drawing, in which like reference characters are used to designate similar or corresponding parts and in which:

Fig. 1 is a schematic circuit of a microwave filter in accordance with the invention comprising nine resonant branches;

Fig. 2 is a longitudinal sectional view of a wave-guide filter following the circuit schematic of Fig. 1, in which the branches are constituted by resonant irises;

Fig. 3 shows plan views of the irises used in the filter of Fig. 2, some of which are located off-center to decrease the band width;

Fig. 4 shows an alternative set of dumbbell-type irises three of which are rotated to decrease the band width;

Fig. 5 shows filter characteristics to be referred to in the description;

Figure 7:
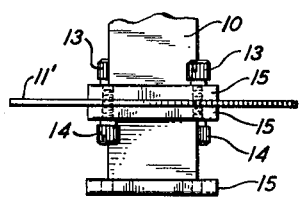
Fig. 7 is a side view of Fig. 6 as seen from the left.

A maximally-flat filter is generically disclosed in United States patent to W. R. Bennett No. 1,849,656, issued March 15, 1932. In that patent it is shown that a uniform transmission characteristic over the band is obtained by the use of filter reactances which have progressively broader selectivities from the center of the filter toward each end, the series reactances being the inverse of the shunt reactances and all resonant at the same frequency. It is there shown that the reactances of the series impedances and the susceptances of the shunt impedances should be proportional to the quantity $$\sin \frac{2r-1}{2n}\pi \qquad (1)$$

where $r$ denotes the order of the impedance counting from the nearer end and $n$ is the total number of impedances.

My copending application Serial No. 24,257, filed April 30, 1948, teaches how to construct maximally-flat wave-guide filters with their branches proportioned and related according to the rules laid down in Bennett's patent. The wave-guide filters specifically disclosed in my copending application employ resonant cavities properly dimensioned and spaced along the guide substantially a quarter wavelength apart or an odd multiple of a quarter wavelength.

In the present application maximally-flat wave-guide filters are disclosed in which, instead of resonant cavities, resonant irises are employed, properly dimensioned and spaced from one another by substantially a quarter wavelength or odd multiple thereof. In both types of embodiments, those using cavities and those using irises, the cavities or the irises form the shunt susceptances of the filter. The series impedances are obtained by taking advantage of the impedance transforming property of a quarter wavelength line. The shunt susceptances are spaced such a critical distance from one another that every alternate one is transformed into a series impedance branch interposed effectively between two shunt branches. In this way the effect of a ladder-type filter comprising series and shunt branches, inverse to each other and properly proportioned, is obtained.

The schematic of such a filter is shown in Fig. 1 with the shunt filter branches 20 represented as parallel-resonant circuits using inductance coils and condensers. No series branches in the form of reactances are represented since, as explained above, these are effectively introduced by the use of quarter wavelength sections of connecting line, or odd multiples thereof, between the shunt branches. As shown in connection with the first two shunt branches 20 at the left-hand end of the circuit, the spacing between successive branches is equal to $(2u-1)\lambda/4$, where $u$ is any integer and $\lambda$ is the wavelength in the connecting section of line at the mid-band frequency $f_0$ of the filter. It will be shown hereinafter how to design a wave-guide filter, in accordance with the invention, which is the counterpart of the schematic shown in Fig. 1, using as the shunt filter branches 20 tuned irises, and spacing these an odd number of quarter wavelengths apart.

Fig. 2 represents an example of such a filter constructed in accordance with one form of the invention. It comprises a wave guide 10, which ordinarily may be a metal tube of rectangular cross-section, in which are positioned at spaced intervals the transverse metal partitions 11, each provided with a window or aperture critically dimensioned to be resonant at the mid-band frequency $f_0$ and provide the proper band width. There are nine partitions 11 comprising four pairs $h$, $m$, $p$ and $s$ symmetrically arranged with respect to the central partition $c$. The inside dimensions of the guide 10 are, $a=1.872$ inches and $b=0.872$ inch. As shown, the spacing between the partitions 11 is approximately equal to an odd integral number of quarter wavelengths at the mid-band frequency $f_0$.

It is assumed in accordance with the embodiment shown in Fig. 2 that the partitions 11 have apertures of the types shown in plan view in Fig. 3. In each of the partitions $c$, $h$, $m$ and $p$ the aperture is "dumbbell" shaped, comprising two circular holes joined by a narrow slot. Each end partition $s$ has a narrow straight slot 24. These apertures have their long dimension perpendicular to the electric vector E and parallel to the "$a$" dimension, that is, parallel to the wider sides of the guide 10.

An interesting property of the dumbbell aperture is that its resonance is narrowed by displacing its center from the exact middle of the guide 10 along the $a$ direction, that is, toward either of the narrower side walls 25. The selectivity $Q_g$, defined below, of such an aperture is related to the displacement $d$ by $$Q_g = Q_{go} \sec^2 \frac{\pi d}{a} \tag{2}$$

where $a$ is the width of the guide 10 and $Q_{go}$ is the selectivity of the centrally positioned aperture. The resonant wavelength is but slightly affected by these displacements. This property permits of readily tapering the band widths of the resonant irises as the middle of the filter is approached from each end by progressively increasing the lateral displacement $d$ of the dumbbell apertures as is shown in the partitions $m$, $h$ and $c$ in Figs. 2 and 3.

It is found as a further interesting property of the dumbbell iris that its band width can also be varied by simply rotating it about the longitudinal axis of the filter and this change in its angular position also does not materially affect its resonant wavelength. Fig. 4 shows the partitions $m'$, $h'$ and $c'$ with dumbbell irises 26, 27 and 28 progressively rotated to give the branches progressively narrower band widths as the center of the filter is approached. These partitions may be substituted in the filter of Fig. 2 for those shown in Figs. 2 and 3. The selectivity of an aperture 28 whose principal axis 30 makes an angle $\theta$ with the wider or $a$ cross-sectional dimension of the wave guide 10 is given by $$Q_g = Q_{go} \sec^2 \theta \tag{3}$$

where $Q_{go}$ is the selectivity when $\theta$ is zero.

As an aid to the design of such a filter, certain general relationships will first be given.

The parameter $Q_g$, which has already been used to indicate selectivity, is called the "normalized loaded Q" and defined as $$Q_g = \left| \frac{1}{\frac{\lambda_{go}}{\lambda_{gc}} - \frac{\lambda_{gc}}{\lambda_{go}}} \right| \tag{4}$$

where $\lambda_{go}$ is the resonant wavelength in the wave guide and $\lambda_{gc}$ is the wavelength at one of the half power or cut-off points.

The insertion loss function K of a maximally-flat filter for the wavelength $\lambda_g$ is given by $$K = 1 + \left[ \frac{\frac{\lambda_{go}}{\lambda_g} - \frac{\lambda_g}{\lambda_{go}}}{\frac{\lambda_{go}}{\lambda_{gc}} - \frac{\lambda_{gc}}{\lambda_{go}}} \right]^{2n} \tag{5}$$

If the bracketed term in Equation 5 is called $\Omega$, a wavelength parameter, the expression may be written as $$K = 1 + \Omega^{2n} \tag{5'}$$

Figure 8:
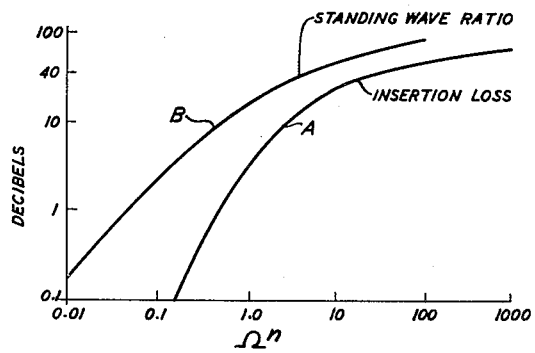
Figs. 8 and 9 show curves useful in designing the filter.

Curve A of Fig. 8 shows a plot of the insertion loss of a maximally-flat filter in decibels as ordinates against the quantity $\Omega^n$ as abscissae. Curve B gives the standing wave ratio. It is noted that both scales are logarithmic.

Now it will be noted that when $n$ is unity the insertion loss function, K, can be written in terms of the $Q_g$ of the branch as defined in Equation 4. When $n$ is greater than unity it is convenient to express the insertion loss function, K, in a similar way, assigning to the total filter a loaded Q defined by the cut-off wavelengths of the total filter as in Equation 4. This loaded Q of the total filter will be called $Q_T$. Thus it is seen that the wavelength parameter, $\Omega$, can then be given, by combining Equations 4, 5 and 5', $$\Omega = Q_T \left| \frac{\lambda_{go}}{\lambda_g} - \frac{\lambda_g}{\lambda_{go}} \right| \quad (6)$$

Also, from the Formula 1, the selectivity, $Q_r$, of any filter branch can be written in terms of the total filter selectivity, $Q_T$, as $$Q_r = Q_T \sin \frac{2r-1}{2n} \pi \quad (7)$$

As an actual example of a filter design, let it be assumed that a filter is required to transmit a band centered about a mid-band frequency, $f_0$ of 4060 megacycles and having a maximally-flat band. The rate of cut-off is given as such that the 2.4-decibel points occur at 3990 megacycles and 4135 megacycles, and the 42-decibel points occur at 3940 megacycles and 4195 megacycles.

These frequencies have corresponding wavelengths in the guide as follows:

$f_2 = 3940$ mc.      $\lambda_{g2} = 12.673$
$f_1 = 3990$ mc.      $\lambda_{g1} = 12.246$
$f_0 = 4060$ mc.      $\lambda_{g0} = 11.708$
$f_1' = 4135$ mc.     $\lambda_{g1}' = 11.194$
$f_2' = 4195$ mc.     $\lambda_{g2}' = 10.823$ From the insertion loss curve A on Fig. 8 values of $\Omega^n$ are obtained corresponding to 42 decibels and 2.4 decibels as 126 and 0.858, respectively. The ratio of these is $$\left( \frac{\Omega_2}{\Omega_1} \right)^n \geq 146.8 \quad (8)$$

Two values of $\Omega$ are found by inserting the wavelength values in Equation 6 as follows:

$$\Omega_2 = Q_T \left| \frac{11.708}{12.673} - \frac{12.673}{11.708} \right| = 0.1586 \, Q_T \quad (9)$$

$$\Omega_1 = Q_T \left| \frac{11.708}{12.246} - \frac{12.246}{11.708} \right| = 0.090 \, Q_T \quad (10)$$

Putting these values in Equation 8 gives $$\left( \frac{0.1586}{0.090} \right)^n = (1.763)^n \geq 146.8$$

from which it is determined that $n \geq 8.8$ and hence nine filter branches are required.

Now since $(\Omega_2)^n$ must be at least 126 to achieve the 42-decibel loss at $f_2$, $Q_T$ is determined by Equation 9, setting $n = 8.8$ $$(0.1586 \, Q_T)^{8.8} = 126$$

from which $$Q_T = 10.93$$

Figure 9:
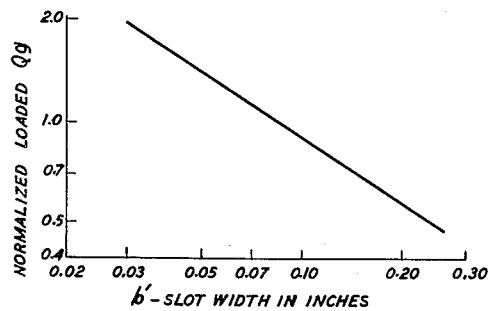

With the quantity $Q_T$ and the number of branches thus determined, the loaded $Q$ for each of the irises 24, 32, 34, 33 and 23, respectively, may now be found from Equation 7 as follows:

$Q_{g1} = 10.93 \sin 10° = 1.90$
$Q_{g2} = 10.93 \sin 30° = 5.47$
$Q_{g3} = 10.93 \sin 50° = 8.37$
$Q_{g4} = 10.93 \sin 70° = 10.28$
$Q_{g5} = 10.93 \sin 90° = 10.93$ The height $b'$ of the rectangular slot 24 in each of the end partitions $s$ for $Q_{g1} = 1.90$ can be read from the graph plotted in Fig. 9 as 0.030 inch. The partitions $s$ are made of metal and are $\frac{1}{32}$ inch thick. The width $a'$ of the slot 24 is so chosen that the iris is resonant at the frequency $f_0$.

It was determined experimentally that a dumbbell iris 32 of the type shown in the partition $p$ in Figs. 2 and 3, made of $\frac{1}{16}$ inch material with ¼ inch holes spaced $\frac{7}{16}$ inch apart and connected by a slot 0.010 inch wide has a value of $Q_g$ of 5.47 and a resonant frequency of 4060 megacycles. This iris was used as the iris 32 in the partition $p$ in Fig. 2.

The dumbbell irises 34, 33 and 23 all have the same aperture and thickness dimensions as the iris 32, and their displacements $d$ from the center line were determined from $$d = \frac{a}{\pi} \cos^{-1} \sqrt{\frac{\sin 30°}{\sin \left( \frac{2r-1}{2n} \right) \pi}} \quad (11)$$

as follows:

$d_m = 0.375$ inch
$d_h = 0.447$ inch
$d_c = 0.468$ inch

The seven dumbbell irises were separated from one another by ¾ wavelength. The two end irises 24 were each separated from the next adjacent iris 32 by ¼ wavelength.

Figure 10:
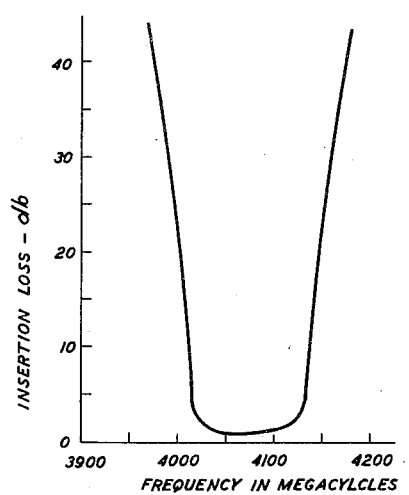
Fig. 10 is a typical insertion loss-frequency characteristic of the filter shown in Fig. 2.

The measured insertion loss of the assembled filter of Fig. 2 is plotted in Fig. 10. It is seen to be quite flat for 100 megacycles and to have 40-decibel insertion loss at frequencies 100 megacycles away from the mid-frequency on both sides. The measured value of $Q_g$ of the total filter is 13.7, while the design aimed at the value 10.93. The major part of this difference can be accounted for by the fact that in the design procedure outlined above no allowance was made for the selectivities of the line sections between the irises, and this would have a considerable effect where band widths as great as this are involved. For example, it is shown in my copending application that the connecting line between filter elements introduces a selectivity which is equivalent to adding a tuned circuit at each of its ends. For quarter wavelength connecting lines these circuits each have a $Q_g$ of $\pi/8$ and for ¾ wavelength line sections each of these circuits has a $Q_g$ of $3\pi/8$, or 1.18. This can be compensated by subtracting an equivalent amount from the $Q_g$ of the filter branches to which the lines are connected. If this is done, the center iris will have its $Q_g$ reduced by $2 \times 1.18$ or 2.36 to compensate the selectivity inherent in the two line sections connected to it and the observed $Q_T$ of 13.7 would then be reduced to 11.34 which is a close approach to the design objective, 10.93.

If, instead of obtaining the increased selectivities of the five middle irises 34, 33 and 23 in the above example by moving them off center as shown in Figs. 2 and 3, their selectivities are increased by rotating the irises in the wave guide as shown in Fig. 4, the required angle of rotation $\theta$ for the irises 26, 27 and 28 is determined by the relation $$\theta = \cos^{-1} \sqrt{\frac{\sin 30°}{\sin \left( \frac{2r-1}{2n} \right) \pi}} \quad (12)$$

In constructing a filter with progressively rotated dumbbell irises in which each end iris is similar to all the others except that it is not rotated, the angle of rotation $\theta$ for the other irises is determined by the relation $$\theta = \cos^{-1} \sqrt{\frac{\sin \frac{\pi}{2n}}{\sin \left( \frac{2r-1}{2n} \right) \pi}} \quad (13)$$

This expression is obtained by combining Equations 1 and 3. A similar expression for the off-center case is obtained by setting $$\theta = \frac{\pi d}{a}$$

in Equation 13.

While the illustrative examples that have been given employ nine filter branches it is found that, using the dumbbell iris, very good filter characteristics can be obtained by use of as few as two irises. For example, a filter using two on-center dumbbell irises dimensioned as above and each having a $Q_g = 5.47$, and spaced a quarter wavelength apart, displayed the excellent properties shown by the (measured) solid line graph of Fig. 5, where the standing wave ratio in decibels is plotted against frequency. Superposed on this same plot is a dotted line characteristic of a two-branch filter using resonant cavities (of slightly higher $Q_g$). The two-iris filter characteristic is free of the double-humped effect shown in the two-cavity filter characteristic.

Figure 6:
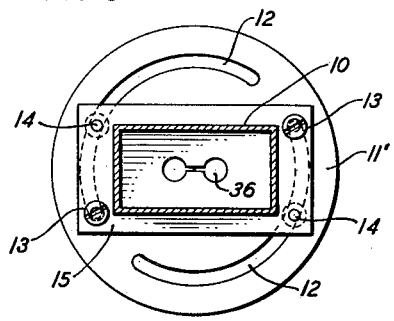
Fig. 6 is a plan view of a rotatable dumbbell-type iris in which the band width may be adjusted.

Rotatable irises have the attractive feature of permitting of adjustment by external control so that an assembled filter can be adjusted and measured until the best characteristic is obtained. One way in which an adjustably rotatable iris can be provided in a wave guide in accordance with this invention is illustrated in Figs. 6 and 7.

The guide tube 10 is made in sections each provided with a flange 15 at the end where it is to be joined to the next section. The dumbbell or other shaped aperture 36 is made in a metal disc 11' containing arcuate slots 12, 12 at such radial distance from the longitudinal center line of the guide as to allow the clamping screws 13, 14 to pass through these slots for all angular positions of disc 11' covering a quarter of a full rotation, thus allowing any required angular adjustment of the dumbbell aperture 36 to be made. The complete filter is assembled with a disc 11' included at each joint for as many sections as desired. The approximate angular position of each disc 11' is set as the filter is assembled, either from predetermined values obtained by calculation or measurement, or by measuring the $Q_g$ during the assembly process. The assembled filter is clamped at all joints and measured. Subsequent adjustments can then be made at any time by loosening the screws 13, 14 at any or all joints, changing the angular setting of the disc or discs 11', and again tightening the screws.

The invention is not to be construed as limited to the details or magnitudes disclosed herein for illustration, since the scope of the invention is defined by the claims.

What is claimed is:

1. A wave filter for transmitting a band of electromagnetic waves comprising a wave guide and a plurality of transverse partitions therein having a spacing approximately equal to an odd integral number of quarter wavelengths at the mid-band frequency, each of said partitions having therein an aperture dimensioned to constitute an iris resonant at said frequency, and two of said irises being of substantially the same size and shape but differently positioned with respect to the longitudinal axis of said guide.

2. A filter in accordance with claim 1 in which the centers of said two irises are located at different distances from said axis.

3. A filter in accordance with claim 1 in which corresponding axes of said two irises make different angles with the electric vector of said waves.

4. A filter in accordance with claim 1 in which one of said partitions is rotatable about its center.

5. A filter in accordance with claim 1 comprising more than two of said irises, the selectivities of said irises being substantially proportional to the quantity $$\sin \frac{2r-1}{2n}\pi$$

where $r$ denotes the order of the iris counting from the nearer end and $n$ is the total number of irises.

6. A filter in accordance with claim 1 comprising more than two of said irises, the centers of said irises being located progressively farther from said axis as the center of the filter is approached from either end.

7. A filter in accordance with claim 1 comprising more than two of said irises, the principal axes of said irises making progressively smaller angles with the electric vector of said waves as the center of the filter is approached from either end.

8. A wave filter for transmitting a band of electromagnetic waves comprising a wave guide and at least three transverse partitions therein having a spacing approximately equal to an odd integral number of quarter wavelengths at the mid-band frequency, each of said partitions having therein an elongated aperture which is dimensioned to be resonant at approximately said frequency, and said apertures becoming progressively more asymmetric with respect to a center line of the cross-section of said guide as the center of the filter is approached from either end.

9. A filter in accordance with claim 8 in which the centers of said apertures are spaced progressively farther from the longitudinal axis of said guide as the center of the filter is approached from either end.

10. A filter in accordance with claim 8 in which the major axes of said apertures make progressively decreasing angles with the electric vector of said waves as the center of the filter is approached from either end.

WILLIAM W. MUMFORD.

REFERENCES CITED

The following references are of record in the file of this patent:

UNITED STATES PATENTS

| Number | Name | Date |
|---|---|---|
| 1,849,656 | Bennett | Mar. 15, 1932 |
| 2,408,055 | Fiske | Sept. 24, 1946 |
| 2,427,100 | Kihn | Sept. 9, 1947 |
| 2,460,288 | Hansen | Feb. 1, 1949 |

OTHER REFERENCES

Microwave Filters Using Quarter-Wave Couplings, by Fano and Lawson, I. R. E. Proceedings, vol. 35, No. 11, Nov. 1947.